United States Patent Office 3,320,234
Patented May 16, 1967

3,320,234
β-ARYLATED NAPHTHOXIDINE CONTAINING MONO AZO DYESTUFFS
Werner Bossard, Riehen, and Hans Bosshard, Basel, Switzerland, assignors to J. R. Geigy A.G., Basel, Switzerland
No Drawing. Original application Mar. 18, 1965, Ser. No. 440,918. Divided and this application Oct. 5, 1965, Ser. No. 509,663
Claims priority, application Switzerland, Nov. 15, 1961, 13,244/61
4 Claims. (Cl. 260—205)

The present application is a division of copending application Ser. No. 440,918, filed Mar. 18, 1965, which is a continuation-in-part of copending application Ser. No. 237,760, filed Nov. 14, 1962 (and now abandoned).

This invention relates to novel azo dyestuffs of the formula:

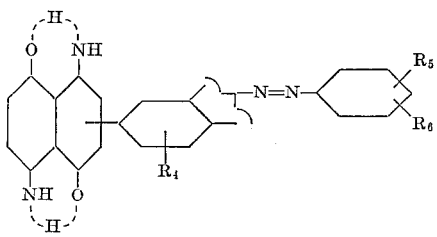

wherein $R_4$ is a member selected from the group consisting of lower alkyl and hydrogen,
$R_5$ is a member selected from the group consisting of hydrogen, lower alkyl, chlorine, bromine, hydroxy, N-mono-lower alkylamino, nitro and N-di-lower alkylamino, and
$R_6$ is a member selected from the group consisting of hydrogen, lower alkyl, chlorine and bromine.

It has been found that the new, valuable arylated naphthoxidines are obtained by reacting compounds of the formula

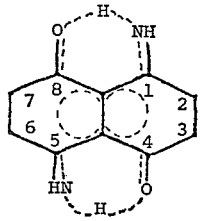

(I)

with aromatic diazonium compounds.

Aromatic diazonium compounds which are suitable as reactants in the process of the present invention are those of carbocyclic radicals, of the formula $$[R-\overset{+}{N}\equiv N]A^-$$  (II)

wherein $A^-$ is a suitable anion such as $Cl^-$, $NO_3^-$, $SO_4^{--}$, $HCOO^-$ and the like. The nature of the anion is not critical.

R in the above formula is a carbocyclic aromatic radical which comprises a benzene nucleus, the amino-substituted analog of which, i.e., $R-NH_2$, is diazotizable. More particularly, the radical R is an azobenzene radical of the formula

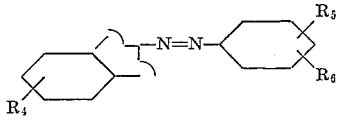

wherein $R_4$ is lower alkyl or H, $R_5$ is H, lower alkyl, chlorine, bromine, hydroxy, lower alkylamino or nitro, and $R_6$ is H, lower alkyl, Cl or Br.

Suitable carbocyclic aromatic diazonium salts are, for example, those of 4-aminoazobenzene, 4-amino-3,2'-dimethyl-azobenzene, etc.

The following example further illustrates the invention. Parts are given therein as parts by weight and the temperatures are in degrees centigrade.

Example 21.8 parts of 1,5-dinitronaphthalene are reduced in known manner with sulfur sesquioxide in 185 parts of sulfuric acid to naphthoxidine. Excess sulfur is removed by filtration and the filtered sulfuric acid solution of the reaction product is diluted with 100 parts of ice. Within 3 hours at 20°, a diazonium sulfate solution obtained by diazotizing 18 parts of 4-amino-3,2'-dimethylazobenzene in 150 parts of concentrated sulfuric acid is added dropwise to this naphthoxidine solution, 170 parts of water being dropped in at the same time. After another 2 hours stirring at 20°, the reaction solution is diluted with 1500 parts of ice and water, the precipitated crude product is separated by filtration, freed from acid by washing with water, and dried. The product is freed from a low-soluble black contamination by extraction with 500 parts of boiling ethyl acetate. A dyestuff is obtained which dissolves in ethanol with a deep pure green, in 50% sulfuric acid with a deep violet color. It is obtained in its pure form by recrystallization from chlorobenzene and corresponds to the formula

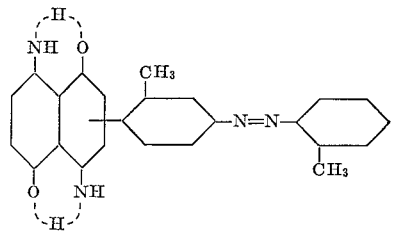

Used in a suitable aqueous dispersion, it dyes polyester fibers and cellulose acetate in pure green shades of good fastness properties.

When, in the above example, the diazonium compounds are replaced by equimolecular amounts of the aminobenzenes listed in the following table, the procedure being otherwise the same as before, correspondingly substituted derivatives of similar properties are obtained.

TABLE

| No. | Amino-azobenzene | Shade of dyeing effected with the corresponding aryl compound on polyester fibers |
|---|---|---|
| 1 | 4-amino-azobenzene | Blue-green. |
| 2 | 4-amino-3-methyl-azobenzene | Green. |
| 3 | 4-amino-2-methyl-azobenzene | Do. |
| 4 | 4-amino-4'-chloro-azobenzene | Bluish-green. |
| 5 | 4-amino-3',4'-dichloro-azobenzene | Blue-green. |
| 6 | 4-amino-4'-hydroxy-azobenzene | Green. |
| 7 | 4-amino-4'-dimethylamino-azobenzene | Blue-green. |
| 8 | 4-amino-2'-chloro-4'-nitro-azobenzene | Bluish-green. |
| 9 | 4-amino-2-methyl-4'-nitro-azobenzene | Do. |
| 10 | 4-amino-3-ethyl-4'-bromo-azobenzene | Green. |
| 11 | 4-amino-4'-ethylamino-azobenzene | Blue-green. |
| 12 | 4-amino-2',4'-dimethyl-azobenzene | Green. |
| 13 | 4-amino-2'4'-dibromo-azobenzene | Blue-green. |

We claim:
1. A dyestuff of the formula

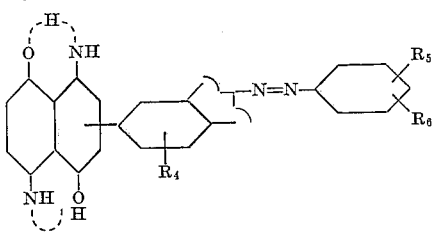

wherein $R_4$ is a member selected from the group consisting of lower alkyl and hydrogen,
$R_5$ is a member selected from the group consisting of hydrogen, lower alkyl, chlorine, bromine, hydroxy, N-mono-lower alkylamino, nitro and N-di-lower alkylamino, and
$R_6$ is a member selected from the group consisting of hydrogen, lower alkyl, chlorine and bromine.

2. A dyestuff of the formula

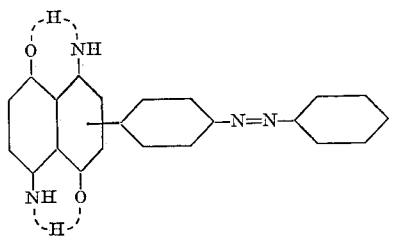

3. A dyestuff of the formula

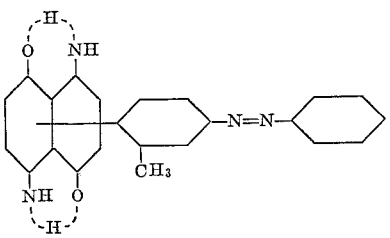

4. A dyestuff of the formula

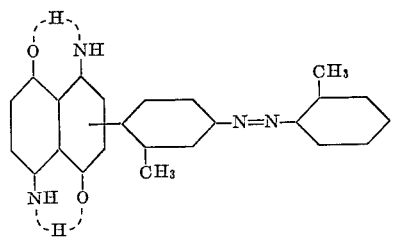

No references cited.

CHARLES B. PARKER, *Primary Examiner.*
DONALD M. PAPUGA, *Assistant Examiner.*